June 2, 1931. B. M. DAWSON 1,807,773
COLLOIDAL MILL
Filed March 30, 1925
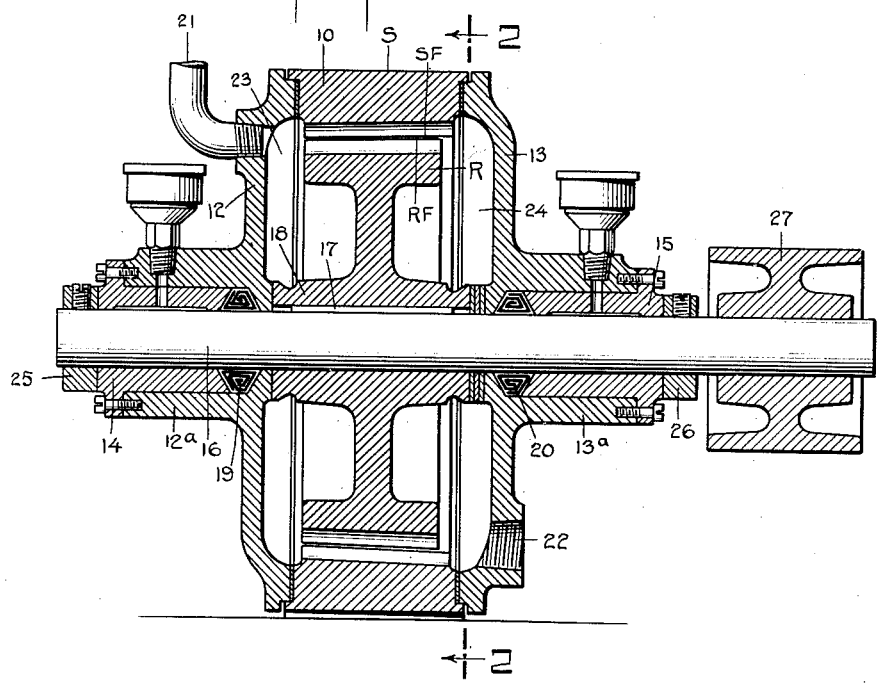
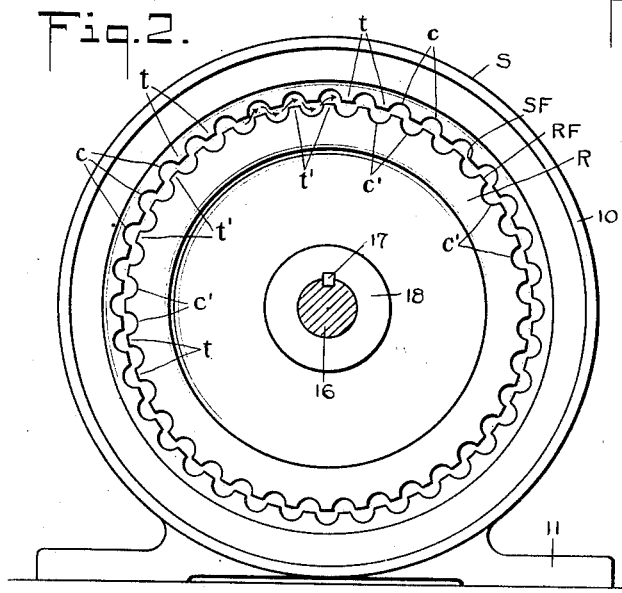
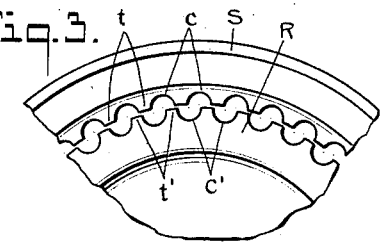
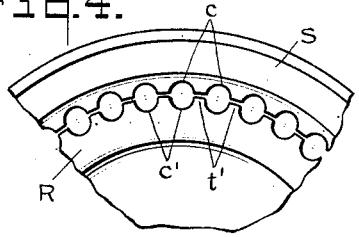
INVENTOR
Baylis M. Dawson
BY
Cavanagh & James
ATTORNEY Patented June 2, 1931

1,807,773

UNITED STATES PATENT OFFICE

BAYLIS M. DAWSON, OF NEWTON, MASSACHUSETTS, ASSIGNOR, BY MESNE ASSIGN-
MENTS, TO FRITZ ZIEGLER, JR., OF NEW YORK, N. Y.

COLLOIDAL MILL

Application filed March 30, 1925. Serial No. 19,281.

This invention relates to disintegrating, emulsifying or homogenizing machines generally known as colloidal mills, and relates more particularly to mills or machines of the type in which solid, semisolid or liquid substances may be fed or passed through a narrow and preferably adjustable clearance gap between the working faces of oppositely movable members which operate to effect the disintegration or disruption of the solid, semisolid or liquid masses into a colloidal state.

Colloidal mills are now generally employed in the industrial arts for a number of purposes, and notably for effecting the disintegration or grinding of solids, the disruption and incorporation of solids in liquids for obtaining colloidal solutions or suspensoids and for effecting the mixture of ordinarily immiscible liquids to homogenize or emulsify the same. When used as an emulsifying or homogenizing machine, a liquid or liquids is or are fed through a clearance gap, in accordance with one type of mill construction, between faces of oppositely rotating members, the oppositely acting faces functioning to effect the disruption or laceration of the liquid particles by a film tearing or shearing action, permitting the intimate incorporation and assimilation of the colloidal particles thereby produced.

As a homogenizing machine, the colloidal mill has been found very effective for use with dairy products, such as cream and milk, or food products, such as baking mixtures and salad dressings, and for various medicinal or pharmaceutical preparations. Its action as an emulsifier may be understood by reference to its use in the manufacture of evaporated milk, to prevent the separation of cream from the milk. When the milk is passed between the working faces of the oppositely acting members of the mill, the membraneous envelopes of the fat globules in the milk are sheared or torn by the working faces, and the particles of fat are thus permitted to escape and become thoroughly assimilated with the particles of casein, a homogenized or emulsified product being thereby produced. The emulsion is thus obtained primarily by a film tearing, cutting or shearing action of the machine.

In another type of disintegrating machine known as the beater type, the substance to be treated is fed between oppositely moving beaters and anvils which cooperate to effect the dispersion or disruption of the substance by a beating or anvil action sometimes combined with a shearing action which takes place as the beaters pass between the anvils. Although these prior machines operating by a film shearing or beating action may be efficiently employed for a variety of uses and with many different solid, plastic and liquid substances, they are generally incapable of efficient service when used to treat dense suspensions and the more viscous liquids such as oils, road preparations, and the like. Such machines also are limited in capacity, and have a relatively high power consumption when employed for making the ordinary lighter emulsions or suspensoids. To improve upon the construction and operation of these machines, and to permit the same to be used with greater facility and with a lower power consumption for the lighter grades of work and to render the same capable of use for the heavier grades of material, thus enlarging the scope of its use in the industrial arts, is a prime desideratum of my present invention.

A principal object of the present invention comprehends more specifically the provision of a colloidal mill in which the working faces of the operating members are constructed and designed to act upon the solid or liquid substances passing therebetween by a film beating and film tearing action combined with a third action, which may be described as a rapid and violent churning action, the combined churning, impact and shearing being most effective in forming an emulsion or in homogenizing a fluid mixture.

A further and correlative object of my present invention comprehends the provision of a colloidal mill of the type referred to in which the operating faces are constructed and cooperate to permit the free flow therebetween of the substance being treated at a relatively low power consumption, permitting efficacious use of the machine on the lighter grades of emulsions, the operating or working faces being so designed as to render the machine capable for use with the relatively heavy grades of work such as oils, road preparations and the like.

To the accomplishment of the foregoing and such other objects as will hereinafter appear, my invention consists in the elements and their relation one to the other, as hereinafter particularly described and sought to be defined in the claims; reference being had to the accompanying drawings which show a preferred embodiment of my invention, and in which:

Fig. 1 is a longitudinal cross-sectional view of a colloidal mill embodying the principles of my present invention, Fig. 2 is a view thereof taken in cross-section on the line 2—2, Fig. 1, and showing the relatively movable members of the mill in one position of operation, and Figs. 3 and 4 are fragmentary views of the same and showing the said members in other positions of operation.

Referring now more in detail to the drawings, the colloidal mill or disintegrating machine comprises relatively movable operating members preferably in the form of a stator S and cooperating rotor R, and preferably of the cylindrical or drum type having the stator face SF and the cooperating rotor face RF, which faces may be provided with a slight taper so that the clearance gap between the stator and rotor may be adjusted to suit the materials or substances with which the machine is to be used. It will be understood that the stator may also be a rotatable member moving in a direction opposite to the direction of rotation of the rotor so that the working faces of the operating members move in opposite directions.

The stator S may constructionally comprise a mid casing section 10 provided with a supporting base 11 and end casing sections 12 and 13 respectively which are fixed in any suitable manner to the mid casing section 10, the end casing sections 12 and 13 being provided with the sleeve portions 12a and 13a, which in conjunction with the bushings 14 and 15 form the bearings for the shaft 16 which is keyed as at 17 to a hub portion 18 forming part of the rotor R.

The casing stator S defines a chamber or compartment sealed at the bearings by the packing 19 and 20 and provided with an entrant duct 21 in the end casing section 12 into which the material or substance to be treated is fed or charged, and an exit duct 22 provided in the end casing section 13 through which the treated material or substance discharges, the material being fed by a combined gravity and suction action from the chamber 23 through the clearance gap or space between the working faces SF and RF and into the chamber 24. The rotor shaft 16 may as usual be provided with means for limiting axial motion thereof, such as the sleeve members 25 and 26 fixed to the shaft and abutting the opposite ends of the bushings 14 and 15 respectively, and may be further provided with any driven means such as the belt pulley or wheel 27 which is connected to any source of power to derive motion therefrom.

As heretofore mentioned, the principal object of the present invention comprehends an improved colloidal mill or disintegrating machine in which the working faces of the operating members are constructed and designed to act upon liquid substances passing therebetween by a film beating and film tearing action combined with a churning action. To accomplish this object of my invention, the working faces SF and RF of the stator and rotor S and R respectively are provided with cooperating depressions or channels disposed or arranged in a direction generally transverse to the movement of one or both of said members, the cooperating faces and depressions co-acting when the rotor and stator are moved relatively to each other to produce a combined churning, film beating and film tearing or shearing action on liquid substances fed therebetween.

In the preferred construction as shown in the drawings, the working faces of both the rotor and stator are provided with alternating depressions, in the form of channels, and teeth, the stator S being provided with the spaced channels or grooves $c$, $c$ and teeth $t$, $t$ arranged in alternation therewith, and the rotor R being provided with the cooperating channels or grooves $c'$, $c'$ and the teeth $t'$, $t'$ also arranged in alternation therewith, the channels and teeth being disposed in a direction generally transverse to the movement of the rotor and being more specifically disposed parallel to the axis of rotation of the rotor.

The principle of operation of the machine embodying these improvements may best be understood by reference to Figs. 2–4 of the drawings, in which a cycle of operation of the machine is illustrated by the sequential views. Referring first to Fig. 2 of the drawings, it will be seen that in the position of the rotor shown therein, the material or subtsance in the rotor grooves or channels is being thrown or projected by centrifugal force out into the grooves of the stator, and the contents in the stator grooves are reflected and projected back into the advancing grooves or channels of the rotor, the substance or material being treated being permitted for the moment to circulate in the clearance gap in a manner shown by the arrows in Fig. 2 of the drawings, the movement of the material being generally in a helical path. When the rotor R moves from the position shown in Fig. 2 to the position shown in Fig. 3, the movement or circulation of the substance is suddenly retarded by the faces of the teeth $t$, $t'$, the effect being to impart a violent churning action to the material, which due to the rapidity of cycle change resulting from the high speed of rotation of the rotor is almost vibratory in effect. This virulent churning action has the dual effect of breaking and lacerating the liquid particles, and of producing a very intimate intermixture of the same.

In addition to this repercussive churning action, as the rotor moves from the position shown in Fig. 2 to that shown in Fig. 3, an anvil or beater action is obtained as the advance edges of the teeth $t'$, $t'$ of the rotor move across and pass the advance edges of the teeth $t$, $t$ of the stator, the parts of the material being caught against the edges of the cooperating teeth, as will be understood by reference to Fig. 2 of the drawings. As the rotor in the next period of the operating cycle moves from the position shown in Fig. 3 to that shown in Fig. 4, the material or substance being treated is acted upon by the cooperating faces of the stator and rotor teeth $t$ and $t'$ by a film tearing or shearing action, as will readily be understood by those skilled in the art.

To permit of the optimum churning, beating and shearing action taking place, the channels or grooves and teeth on the rotor are made equal in number to those on the stator, and the face width of the teeth $t$ and $t'$ are made less than the largest width or diameter of the channels $c$ and $c'$, and as will be understood by reference to Fig. 2 of the drawings, this construction most effectively permits the sudden acceleration and retardation of the movement of the material between the operating faces and hence the reverberatory or repercussive churning action desired.

The operation, use and many advantages of my improved colloidal mill will in the main be fully apparent from the above detailed description thereof. It will be apparent that by the provision of the alternating depressions and teeth in the rotor and stator disposed and arranged as described, as the rotor moves there is a forced interchange of material between the rotor and stator in a wave or churning motion, a beating or anvil effect being obtained in passing between the points or edges of the teeth, and a film tearing action being obtained as the broad faces of the teeth pass each other. With this construction it has been found that perfect emulsions may be made on viscous substances such as oils and like material. It has also been experimentally determined that a ready and smooth flow of material through the machine is obtained, permitting facile operation and low power consumption. The flow of the material through the grooves or channels may be retarded if desired, and for this purpose the channels may terminate a short distance from the exit end of the rotor and stator, leaving smooth annular surfaces which may act as a finishing section in addition to retarding the flow through the grooves. The combined beater, film shearing and repercussion churning action has been found very effective for use on ordinary emulsions such as dairy products and pharmaceutical preparations.

While I have described my invention in the preferred form, it will be understood that many changes and modifications may be made in the structure disclosed without departing from the spirit of the invention, defined in the following claims.

I claim:

1. A colloidal mill for disintegrating and emulsifying materials, comprising relatively movable members having cooperating drum faces between which the materials to be disintegrated are adapted to flow, the faces of both members being provided with parallelly arranged alternating teeth and channels disposed in a direction generally transverse to the movement of one of said members, the face width of the teeth being less than the width of the channels.

2. A colloidal mill for disintegrating and emulsifying materials, comprising rotor and stator substantially cylindrical members having tapered cooperating faces between which the materials to be disintegrated are adapted to flow, the faces of both the rotor and stator members being provided with parallelly arranged alternating channels and teeth disposed in a direction generally transverse to the movement of the rotor, the channels and teeth on the rotor being equal in number to those on the stator and the face width of the teeth being less than the width of the channels.

3. An apparatus for homogenizing or emulsifying materials comprising a pair of members having closely adjacent, non-contacting, cooperating faces relatively movable one past the other at a high speed between which the materials are fed for treatment, each of said faces being provided with alternating continuous channels and continuous teeth arranged in a direction generally transverse to the movement of one of said faces, the face width of the teeth on at least one of said members being less than the width of the channels thereon so that when the faces are relatively moved at a high speed, the materials fed between the faces are subjected to the film beating action of passing teeth sides and edges, to the film shearing action of cooperating teeth surfaces, and to the churning action of cooperating channels.

4. An apparatus for homogenizing or dispersing materials which comprises a member having a frusto-conical rotor surface rotatable at a high speed and having alternate teeth and channels arranged in a direction generally transverse to the movement of said surface, and a member having a frusto-conical stator surface surrounding said rotor surface in closely adjacent non-contacting, cooperating relationship therewith and having alternate teeth and channels arranged in a direction generally transverse to the movement of said rotor surface, the teeth on both said surfaces terminating in respectively opposed flat faces which form edges with the sides of their respective teeth, and said channels having their sides sloping inwardly towards the channel bottom, the teeth and channels on the rotor member being equal in number to those on the stator member and the face width of the teeth on at least one of said members being less than the width of the channels thereon, whereby materials fed between the surfaces relatively moving at a high speed are subjected to a film shearing action between the cooperating terminal faces of the teeth, to a film beating action by passing teeth sides and edges and to a churning action by cooperating channels.

5. An apparatus for homogenizing or emulsifying materials comprising rotor and stator members having cooperative faces relatively movable at a high speed between which the materials are fed for treatment, the faces of both members being provided with alternating depressions and teeth arranged generally co-directionally with the axis of said rotor member, and the teeth of the respective members having closely adjacent, non-contacting cooperating surfaces, the width of the teeth and the width of the depressions on both of said members being related so that when the said members are relatively moved at a high speed the materials fed between the members are subjected to alternating rapid circulatory movements and retardations due to the relative re-arrangement of teeth and depressions of the rotor and stator members, and are further subjected to a film shearing action between the cooperating teeth surfaces and to a film beating action between passing teeth edges, the width of the teeth on at least one of said members being less than the width of the depressions thereon.

Signed at Boston in the county of Suffolk and State of Massachusetts, this 26th day of March, A. D. 1925.

BAYLIS M. DAWSON.